(12) United States Patent
Ankrom et al.

(10) Patent No.: US 12,506,513 B2
(45) Date of Patent: Dec. 23, 2025

(54) SHARING SECURE USER INFORMATION USING NEAR-FIELD COMMUNICATION

(71) Applicant: Oracle International Corporation, Redwood Shores, CA (US)

(72) Inventors: Zachary S. Ankrom, Austin, TX (US); Jan Bajec, Utrecht (NL); David Allan James Drewette, Dollar (GB)

(73) Assignee: Oracle International Corporation, Redwood Shores, CA (US)

( * ) Notice: Subject to any disclaimer, the term of this patent is extended or adjusted under 35 U.S.C. 154(b) by 275 days.

(21) Appl. No.: 18/356,684

(22) Filed: Jul. 21, 2023

(65) Prior Publication Data

US 2024/0380433 A1 Nov. 14, 2024

Related U.S. Application Data

(60) Provisional application No. 63/501,742, filed on May 12, 2023.

(51) Int. Cl.
*H04W 12/47* (2021.01)
*H04B 5/72* (2024.01)
*H04W 12/08* (2021.01)

(52) U.S. Cl.
CPC .............. *H04B 5/72* (2024.01); *H04W 12/08* (2013.01); *H04W 12/47* (2021.01)

(58) Field of Classification Search
CPC ......... H04B 5/72; H04W 12/47; H04W 12/08
USPC .......................................................... 455/41.1
See application file for complete search history.

(56) References Cited

U.S. PATENT DOCUMENTS

| | | | |
|---|---|---|---|
| 8,275,632 B2 | 9/2012 | Awaraji et al. | |
| 9,855,785 B1 * | 1/2018 | Nagelberg | G06K 19/06028 |
| 11,063,770 B1 | 7/2021 | Peng | |
| 11,443,838 B1 * | 9/2022 | Cordonnier | G16H 50/70 |
| 12,106,288 B2 * | 10/2024 | Andral | G06Q 20/401 |

(Continued)

FOREIGN PATENT DOCUMENTS

KR 20220129245 A 9/2022

OTHER PUBLICATIONS

International Search Report and Written Opinion for International Application No. PCT/US2024/021434 dated Jun. 24, 2024.

(Continued)

*Primary Examiner* — April G Gonzales
(74) *Attorney, Agent, or Firm* — Potomac Law Group, PLLC

(57) ABSTRACT

Embodiments permit secure information exchange using lightweight data and near-field communication (NFC). A user can transmit lightweight data, such as one or more indicators (e.g., user indicator, scope indicator(s), documents indicator(s), etc.), to a receiving computing system via the user's wireless device and an NFC protocol. Because NFC transmissions are performed by co-located devices, this lightweight data transmission can trigger and/or continue a sophisticated workflow. For example, the receiving computing system can be associated with a product or service provider, and the lightweight data transmission can progress a workflow related to a particular product and/or service. The workflow progression can include accessing secure user information via the indicator(s) received over the NFC transmission.

20 Claims, 10 Drawing Sheets

(56) References Cited

U.S. PATENT DOCUMENTS

| | | | |
|---|---|---|---|
| 2008/0172737 A1* | 7/2008 | Shen | G16H 10/60 726/21 |
| 2012/0179490 A1 | 7/2012 | Fuhrmann et al. | |
| 2014/0219453 A1* | 8/2014 | Neafsey | H04W 12/06 455/41.1 |
| 2014/0223523 A1* | 8/2014 | Neafsey | H04W 12/03 726/5 |
| 2017/0076405 A1 | 3/2017 | Shah | |
| 2018/0211059 A1 | 7/2018 | Aunger et al. | |
| 2019/0356641 A1* | 11/2019 | Isaacson | H04L 9/3231 |
| 2020/0053081 A1* | 2/2020 | Park | H04L 63/0876 |
| 2020/0082139 A1* | 3/2020 | Peeters | A61B 5/14514 |
| 2020/0168306 A1* | 5/2020 | Chen | G16H 10/60 |
| 2020/0226285 A1* | 7/2020 | Bulleit | G06F 21/33 |
| 2020/0334229 A1 | 10/2020 | Harrison et al. | |
| 2021/0044637 A1 | 2/2021 | Lee et al. | |
| 2021/0174972 A1* | 6/2021 | Pavlatos | G16H 10/60 |
| 2021/0357893 A1* | 11/2021 | Kang | G06Q 20/1235 |
| 2021/0366586 A1* | 11/2021 | Ryan | G06Q 20/3224 |
| 2022/0035936 A1* | 2/2022 | Lin | H04L 9/0894 |
| 2022/0123950 A1 | 4/2022 | Erickson et al. | |
| 2022/0150711 A1* | 5/2022 | Lim | H04W 12/08 |
| 2022/0158997 A1* | 5/2022 | Guinard | G06F 16/958 |
| 2022/0222364 A1* | 7/2022 | Roberts | G06F 21/64 |
| 2022/0374875 A1* | 11/2022 | Madisetti | G06Q 20/389 |
| 2023/0108610 A1* | 4/2023 | Tang | G06Q 20/3672 705/66 |
| 2023/0118312 A1 | 4/2023 | Sun | |
| 2023/0126016 A1* | 4/2023 | Nelson | G06F 16/23 705/65 |
| 2023/0130347 A1* | 4/2023 | Ravinathan | G06Q 20/3829 705/71 |
| 2023/0354020 A1* | 11/2023 | Rule | H04W 12/06 |
| 2023/0403144 A1 | 12/2023 | Rhodin | |
| 2023/0421399 A1* | 12/2023 | Quirk | H04L 9/3239 |
| 2024/0037539 A1* | 2/2024 | Nonni | H04L 9/3213 |
| 2024/0061951 A1 | 2/2024 | Innanje et al. | |
| 2024/0126919 A1 | 4/2024 | Ankrom et al. | |
| 2024/0220939 A1* | 7/2024 | Ropel | G06Q 10/20 |
| 2024/0221439 A1* | 7/2024 | Ropel | G06F 16/211 |
| 2024/0275770 A1* | 8/2024 | Agrawal | H04L 63/08 |
| 2024/0354866 A1* | 10/2024 | Schwartz | H04L 9/3239 |
| 2024/0382493 A1* | 11/2024 | Ankrom | A61K 31/53 |
| 2025/0131994 A1 | 4/2025 | Gross et al. | |
| 2025/0291948 A1 | 9/2025 | Gnanasambandam et al. | |

OTHER PUBLICATIONS

International Search Report and Written Opinion for International Application No. PCT/US2024/021435 dated Jun. 24, 2024.

International Search Report and Written Opinion for International Application No. PCT/US2024/021921 dated Jul. 1, 2024.

International Search Report and Written Opinion for International Application No. PCT/US2023/032871 dated Dec. 4, 2024.

* cited by examiner

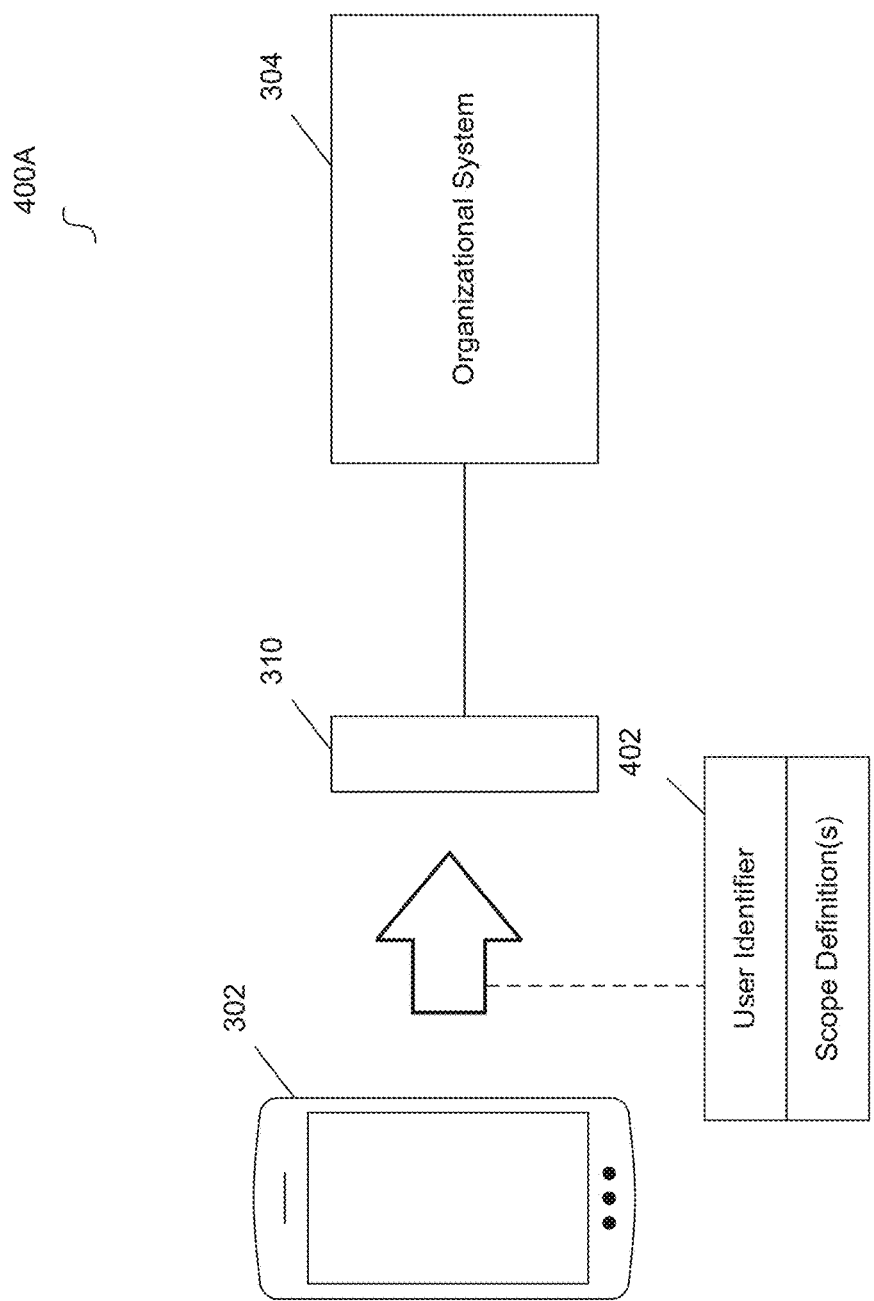

Fig. 4B

SHARING SECURE USER INFORMATION USING NEAR-FIELD COMMUNICATION

FIELD

The embodiments of the present disclosure generally relate to permitting secure information exchange using lightweight data and near-field communication.

BACKGROUND

The proliferation of computing and connected devices has generated vast amounts of data that requires management. As data grows in size, the technological challenges related to efficiently managing the data has become increasingly complex. For example, sharing secure data among multiple parties has been a longstanding problem in the field of data management. Security techniques that permit a user to manage secure information, such as authentication, validation, and permission workflows, can be cumbersome and, in some scenarios, impractical. Security protocols that achieve practical secure data sharing in scenarios that cause friction for traditional data sharing protocols can provide substantial value.

SUMMARY

The embodiments of the present disclosure are generally directed to systems and methods for permitting scope limited access to a user's secure information using near-field communication. Sharing data can be determined at a wireless device that comprises a user indicator and one or more scope indicators, wherein the user indicator identifies a user and the one or more scope indicators represent scope definitions with respect to the user's secure information. An NFC device proximate to the wireless device can be detected. In response to the detecting, the determined sharing data can be transmitted to the NFC device using an NFC communication protocol. The NFC device can be part of an organizational computing system, the organizational computing system can request, from a secure data source, access to the user's secure information using the user indicator and the one or more scope indicators from the sharing data, and the organizational computing system is permitted, by the secure data source in response to the request, scope limited access to the user's secure information that corresponds to the one or more scope indicators.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4A illustrates near-field communication between systems according to an example embodiment.

FIG. 4B illustrates a simplified data model according to an example embodiment.

DETAILED DESCRIPTION

Figure 1:
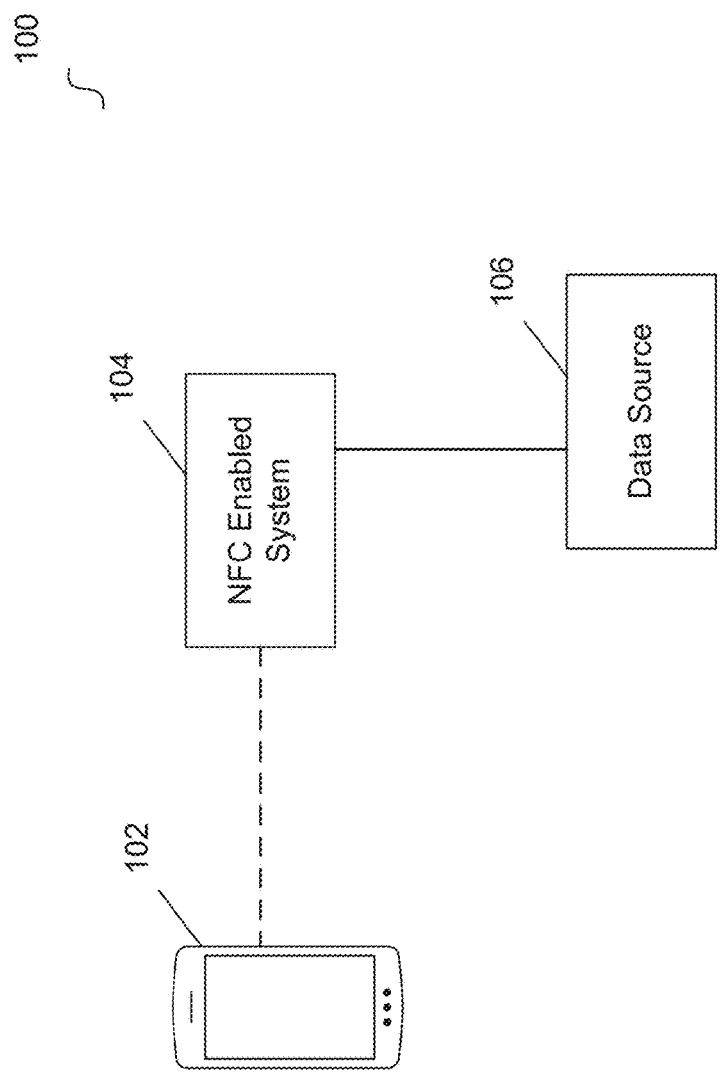
FIG. 1 illustrates a system for permitting secure information exchange using lightweight data and near-field communication according to an example embodiment.

Embodiments permit secure information exchange using lightweight data and near-field communication (NFC). A user can transmit lightweight data, such as one or more indicators (e.g., user indicator, scope indicator(s), documents indicator(s), etc.), to a receiving computing system via the user's wireless device and an NFC protocol. Because NFC transmissions are performed by co-located devices, this lightweight data transmission can trigger and/or continue a sophisticated workflow. For example, the receiving computing system can be associated with a product or service provider, and the lightweight data transmission can progress a workflow related to a particular product and/or service.

In some implementations, the indicator(s) transmitted over the NFC transmission(s) can reference one or more of the user, electronic document(s), secure user information, portions of a workflow, other suitable electronic information related to the user, or any combination thereof. For example, the NFC transmission of the indicator(s) can represent a physical "check-in" at a service provider. The receiving system (e.g., computing system associated with the service provider) can retrieve stored information referenced by the transmitted indicator(s), such as electronic documents associated with the user (e.g., pre-filled questionnaires, personal information, etc.), secure user information (e.g., electronic health records), and the like. In another example, the NFC transmission can be a signal that references portions of a workflow, such as the stages of a health care appointment, device/system usage workflow, or the like. In this example, using the NFC transmissions and the context in which they occur (e.g., timestamps, etc.) the service provider can audit appointments (e.g., health care appointments), device usage, system usage, or other suitable workflows for compliance, safety, and/or production metrics.

In some implementations, the indicator(s) transmitted from the user's wireless device to the receiving system can be encoded and/or encrypted. For example, the wireless device may comprise credentials (e.g., public and/or private cryptographic keys, etc.), and the indicator(s) may be encrypted, digitally signed via a credential, etc. In another example, the indicator(s) can be encoded via a translation module (e.g., predefined mapping) that maps indicator(s) to encoded data (e.g., symbols, etc.). In some implementations, the encoding and/or encrypting may compress data such that the NFC payload size (e.g., indicator(s)) is compatible with NFC protocols and/or is practical to transmit via NFC.

Embodiments also permit scope limited access to a user's secure information using NFC information exchange(s). In some implementations, a user can register with a secure data source and control the scope with which the user's secure information (e.g., electronic health records) is shared. For example, the user can, via a wireless device or other suitable computing system, select scope definitions that control how the user's secure information is shared with an organization. The user can transmit, via NFC and the user's wireless device, sharing data to the organization's computing system. The organization's computing system can then submit a request to access the user's secure information using the information received from the user's wireless device to the secure data source. For example, information within the request can include aspects of the received sharing data, such as a user indicator, scope indicator(s) (e.g., indicator(s) representative of the user's selected scope definitions), and the like. In some implementations, the sharing data can comprise encrypted and/or encoded indicator(s).

Embodiments of the user's secure information can be electronic health data segmented based on segments and segment dimension values, and scope definitions that define the access restrictions to the user's secure information can correspond to limited portions of the user's electronic health data. For example, the segments can include: originating physician and/or medical organization (e.g., entity identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), images (e.g., radiology scans, x-rays, ultrasound images, MRI images, and the like), date of information origination, electronic health record format, other Health Level Seven (HL7), Fast Healthcare Interoperability Resource (FHIR), and/or Substitute Medial Applications and Reusable Technologies (SMART) on FHIR data parameters, or any other suitable health data parameters. In some embodiments, segments can include structured and unstructured data. The user can define what portions of the user's electronic health data to share via NFC transmission(s) by providing segment dimension values that define the scope.

The user can define the scope definition(s) for NFC transmission(s) (e.g., the scope definitions that define which portions/segments of a user's secure information to share) using an information management application executing at the user's wireless device. For example, the user can define a sharing scope that identifies data points of the user's secure information that can be shared with an organization via NFC transmission(s). In another example, the user can define scope definition(s) by selecting individual documents, groups of documents, or any other suitable portion of secure user information stored at a secure data source to share via NFC transmission(s).

Embodiments achieve efficient and lightweight information exchanges that effectively and securely share sensitive information. For example, the colocation aspects of NFC transmission(s) reduce the risk of a fraudulent attempt to access a user's secure information. In addition, the techniques that selectively scope the NFC payloads (e.g., scope and/or user indicators, encoding/encryption, etc.) enable sharing of secure information via transmission(s) that are practical for NFC protocols. Some embodiments provide encoding and encrypting to achieve an efficient and secure sharing workflow.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for permitting secure information exchange using lightweight data and near-field communication (NFC) according to an example embodiment. Diagram 100 includes wireless device 102, NFC enabled system 104, and data source 106. Wireless device 102 can be associated with a user and NFC enabled system 104 can be associated with an organizational system. Example organizations include a service provider (e.g., auto repair, home repair or service, training service, etc.), health care entity (e.g., hospital, private practice office, emergency clinic, etc.), and the like. Wireless device 102 can be a smartphone, tablet, wearable device, or any other suitable portable electronic device. NFC enabled system 104 can comprise a computing system (e.g., computers, servers, storage devices, sensors, computing peripherals, etc.) that includes an NFC enabled communication device.

Wireless device 102 can comprise an information management application, such as an application that permits a user to manage the user's secure information (e.g., personal records, property records, vehicle records, electronic health records, etc.). The information management application (e.g., native application, web application, etc.) executing at the user's wireless device can permit the user to configure NFC transmission(s) to NFC enabled system 104. For example, the user can select scope definitions (e.g., document identifiers, segments or portions of secure user information, etc.) via the information management application. The scope definitions define what parts or portions of the user's secure information that NFC enabled system 104 is granted access to via NFC transmission(s) from wireless device 102.

Wireless device 102 and NFC enabled system 104 can comprise NFC enabled hardware that permits information sharing via a secure NFC protocol. The user can configure the information management application to share data with NFC enabled system 104 when wireless device 102 is proximate to an NFC reader component of NFC enabled system 104. For example, the sharing data transmitted from wireless device 102 to NFC enabled system 104 via the information management application can comprise: an indicator for the user, scope definitions (e.g., documents identifiers, segments or portions of secure user information identifiers, etc.), and any other suitable data.

NFC enabled system 104 can then access the user's secure data via data source 106 and the data shared by the information management application executing at wireless device 102 over the NFC transmission. For example, data source 106 can store the user's personal records, property records, vehicle records, electronic health records, standardized electronic health data forms, and the like. Data source 106 can be a secure database, cloud data storage system, on-premise data storage system, network attached storage, any combination thereof, or any other suitable secure data store.

NFC enabled system 104 can retrieve and/or request access to the user's secure information using the user identifier and/or scope definitions received from wireless device 102 over the NFC transmission. For example, NFC enabled system 104 can associate the user identifier with documents the user has previously completed (e.g., via wireless device 102 or any other suitable device) that are stored at data source 106, and retrieve and/or request access to these documents. In another example, NFC enabled system 104 can identify documents via document identifier(s) comprised in the scope definitions received from wireless device 102, and retrieve/request access to these identified documents from data source 106. In another example, the scope definitions received from wireless device 102 can define segments of a user's secure information (e.g., electronic health records segments and dimension values), and NFC enabled system 104 can retrieve/request access to these segments of the user's secure information from data source 106.

In order to perform NFC transmission(s), wireless device 102 is collocated (in the same physical location) with NFC enabled system 104. Accordingly, the NFC functionality can be a portion of a workflow, such as a check-in workflow at a service provider. For example, the check-in workflow may relate to a patient check-in at a health care facility. The NFC transmission from wireless device 102 to NFC enabled system 104 may accomplish several components of such a workflow, such as indicate the patient has arrived in-person for the medical appointment, obtain access to the patients pre-filled forms and/or medical records, trigger additional documents/paperwork that may be absent from the patient's records, and the like. In some implementations, the user of the mobile device (e.g., patient) inputs information to verify the user's identity such as name, date of birth, email address, phone number, security question, or other verifying information.

In some implementations, a direct data transfer of health records can be accomplished from wireless device 102 to NFC enabled system 104 using a small text file in JSON format or using standard bandwidth file sizes. The JSON file transfer serves as an alternative if wireless device 102 is in offline mode and/or for transfer of limited records (e.g., immunization information, etc.).

Figure 2:
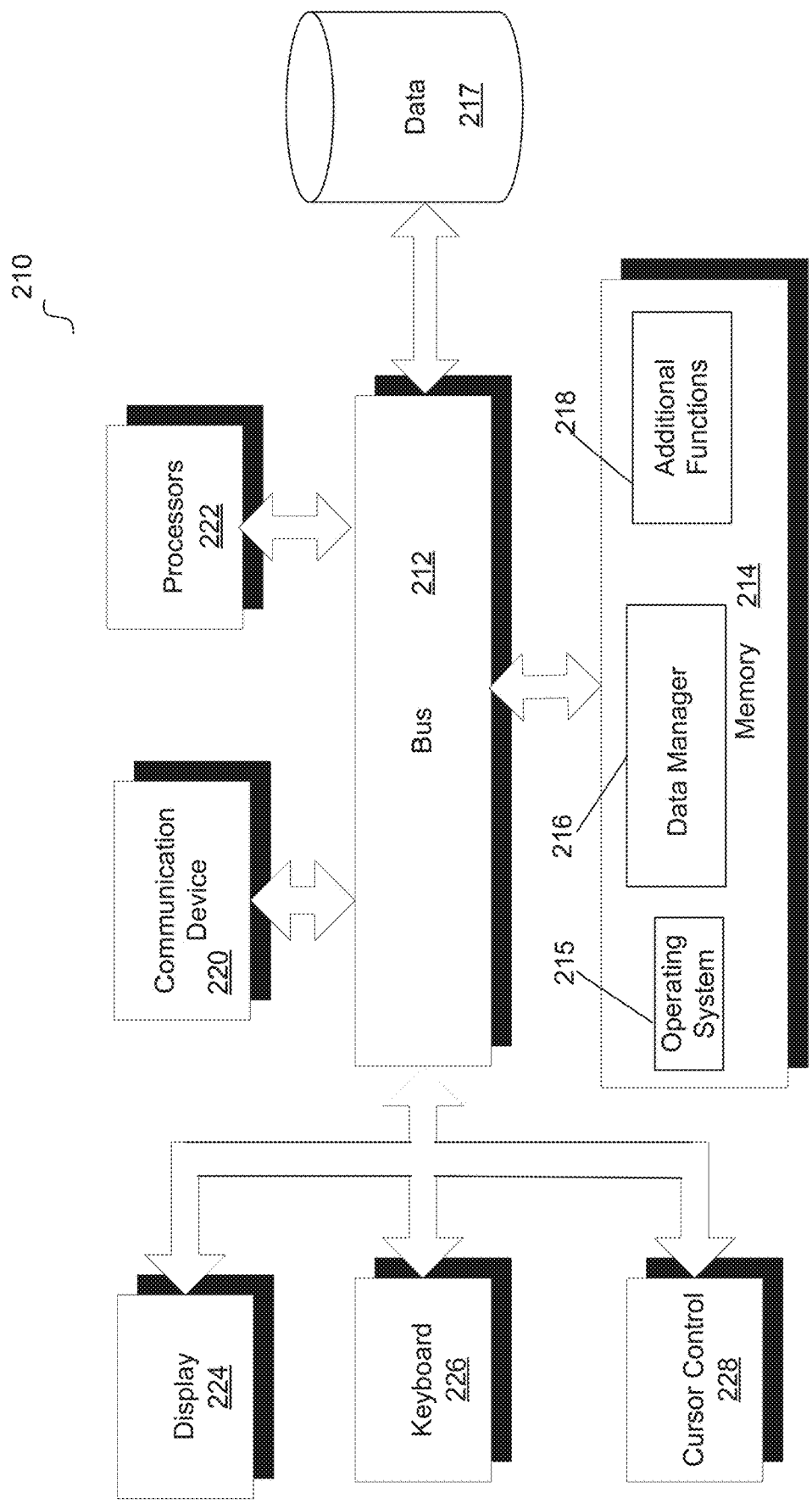
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, migration prediction component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, data manager 216, as well as other applications modules 218. Operating system 215 provides operating system functionality for system 210. Data manager 216 may provide system functionality for permitting scope limited access to a user's secure information to via NFC transmission(s), or may further provide any other functionality of this disclosure. In some instances, data manager 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of Oracle® Data Integrator, Oracle® Cloud Infrastructure, Oracle® Autonomous Database, Oracle® Cerner®, Oracle® Cerner Millennium®, Oracle® Cerner® HealtheIntent®, Oracle® Cerner® Seamless Exchange, Oracle® Cerner® HealtheCare, Oracle® Cerner® HealtheLife and representative products across the Oracle® Health & Artificial Intelligence platform for example. A database 217 is coupled to bus 212 to provide centralized storage for modules 216 and 218 and to store, for example, registered person validation information, vetted entity information, authentication and validation related information, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), disaster recovery database, backup database, or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

In some implementations, a user configures the user's wireless device to permit sending and/or receiving NFC transmission(s). For example, in order to configure NFC at the user's wireless device, the user can enable NFC via device settings. The user can then enable NFC at the user's information management application, such as select NFC as an identification verification technique that can be read by healthcare providers' reader device. By enabling the NFC technology or associated chip, the identification associated with the chip can also be added as an identifier on the user's secure information/health account and approved as a technique of identify verification. Based on the identifier information and enabled settings, the NFC identifier linked to user's secure information/electronic health record could also be stored, communicated, or accessed via a blockchain and transactions logged on a Hyperledger.

Once enabled, the NFC technology can be used to expedite the user's (e.g., patient, guardian, care giver, etc.) registration or check-in procedures at a healthcare provider. Example registration and check-in procedures include: the user presenting to their health-related visit (e.g., appointment, surgery, urgent care, and the like); and the user placing the user's wireless device near the vetted entity/healthcare provider reader device to identify the user for their health-related visit. The user's wireless device could either be configured to read the identification from the background of the phone or the user could open their information management application and click a button to enable the reading of the NFC to check-in for the health-related visit.

The NFC device reader can be linked to the health care provider's overall software system, and using the information read from the user's wireless device the software system can identify the user's secure information/electronic health record. In some embodiments, the user can continue registration, for example when a notification is received on the user's wireless device (e.g., triggered by the health care provider's software system) to confirm: the user's appointment; the user's identity by presenting the user's name, provider name, practice name, location address, date and time of the appointment, etc. The user can then accept, deny, or report problem with the check-in/registration.

In some embodiments, once accepted the user's wireless device can verify the user's identity by performing one or more of: a biometric reading using the device (e.g., face id, thumbprint, eye scan, etc.); two-factor or multi-factor authentication; providing an encrypted rotating passkey to the healthcare provider; and/or other configuration settings that the patient or healthcare provider may implement. Once the user has verified their identity (and other procedures are complete), the healthcare provider's software system can indicate that the patient's visit status has changed from confirmed to checked-in. The user can be re-directed to complete any additional procedures (e.g., documentation and questionnaires) from the information management application or a profile available on a mobile application or web-based browser.

In some implementations, a user completing the NFC check-in can be an authenticated user (e.g., logged into a portal) or an unauthenticated user (e.g., not logged into a portal). For example, the information management application used to perform the NFC check-in can be a web application that involves a login (e.g., username and password), such as a web portal login. In this example, the NFC check-in can be part of a larger workflow, such as a check-in at an appointment. In response to the check-in, the web portal/web application can trigger additional functionality and/or progress the larger workflow, such as: access documentation the user previously filled out, identify additional documentation that user is to complete, verify additional user information (e.g., identify verification, insurance verification, etc.), resolve billing issues, and the like.

In another example, the NFC check-in can be performed by an unauthenticated user (e.g., not logged into a portal). In this example, the receiving system of the NFC transmission (e.g., from the user's wireless device) can "look up" the user via the identifier transmitted through the NFC check-in. Once the user is identified, additional functionality and/or workflow progress can be taken, such as: accessing documentation the user previously filled out, identifying additional documentation that user is to complete, verifying additional user information (e.g., identify verification, insurance verification, etc.), resolving billing issues, and the like.

The information management application at a user's wireless device (e.g., NFC enabled device) can be associated with any suitable user entity or account. For example, the user's participation in a workflow can be tracked and audited by a system, such as tracking/logging location based activity using NFC enabled scanning device(s) placed at the particular location(s). In this example, the user may be a clinician (e.g., healthcare provider) and the clinician's actions can be tracked via the information management application/user wireless device. Examples include: a clinician checking into a certain location by scanning a wireless device to an NFC chip, a clinician performing a related task to track and initiate additional workflows, etc. The wireless device (e.g., executing the information management application) can comprise a mobile device (e.g., smartphone), tablet, NFC chip, or the like that can be connected to an electronic health record account and/or system account that monitors workflow.

In some embodiments, the NFC chip embedded within the user's wireless device or identification card is placed in close proximity to (e.g., within 4 centimeters from) the NFC device reader in order for the chip to be read. For example, NFC proximity can be short-range to protect against identity and potential theft. Any suitable NFC standard (e.g., NFC-A, NFC-B, NFC-F, etc.) can be implemented by the NFC enabled chip(s).

Figure 3:
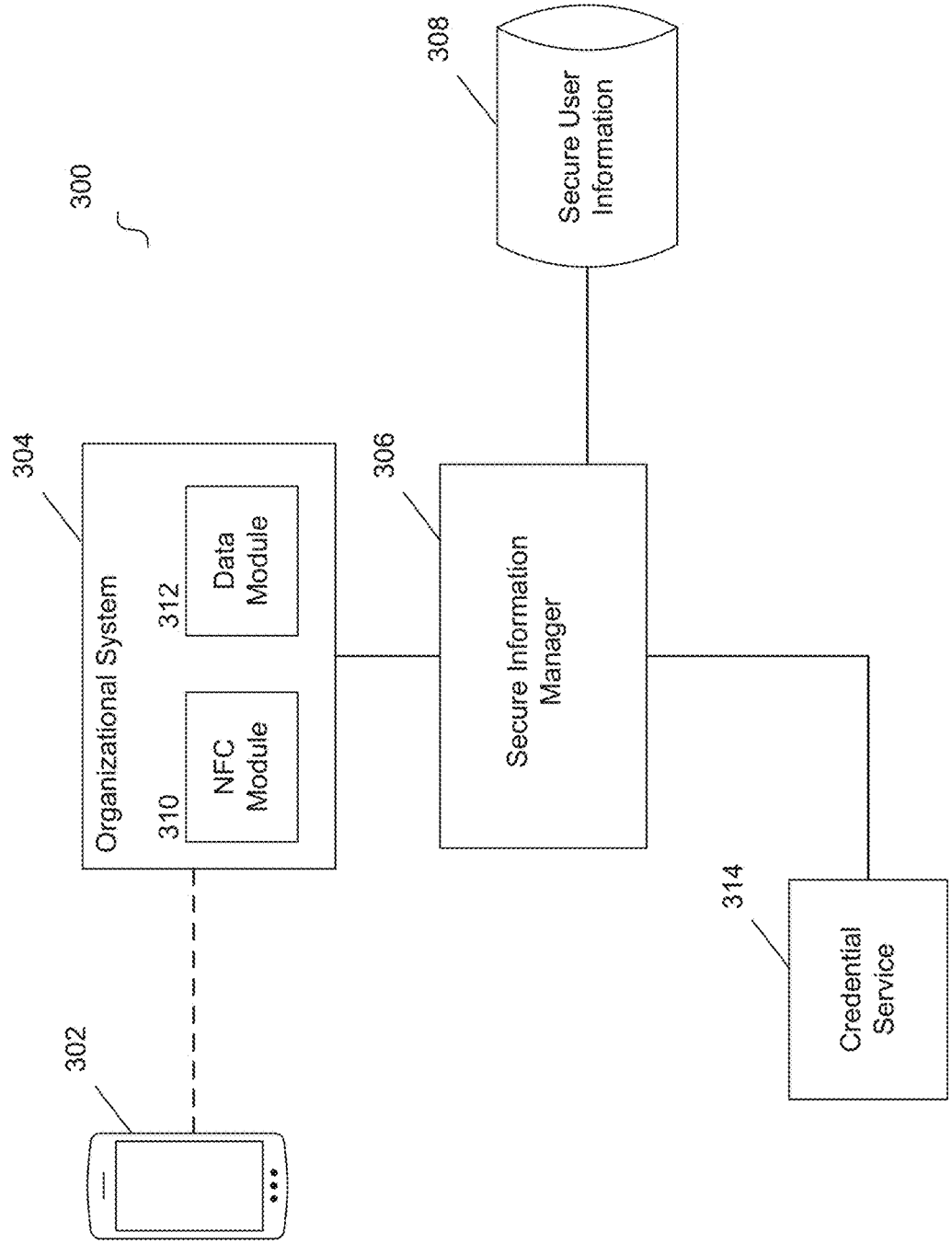
FIG. 3 illustrates a system for permitting scope limited access to a user's secure information using near-field communication according to an example embodiment.

In some implementations, NFC transmission(s) configured by an information management application executing at a user device can support secure sharing of user secure information, such as portions of the user's electronic health record. FIG. 3 illustrates a system for permitting scope limited access to a user's secure information using near-field communication according to an example embodiment. Diagram 300 includes wireless device 302, organizational system 304, secure information manager 306, secure user information 308, NFC module 310, data module 312, and credential service 314.

Wireless device 302 can be associated with a user and organizational system 304 can be a system of devices associated with an organization, such as a health care entity (e.g., hospital, private practice office, emergency clinic, etc.). Wireless device 302 can be a smartphone, tablet, wearable device, or any other suitable portable electronic device. Organizational system 304 can comprise a computing system (e.g., computers, servers, storage devices, sensors, computing peripherals, etc.) that includes NFC module 310 and data module 312.

Figure 5A:
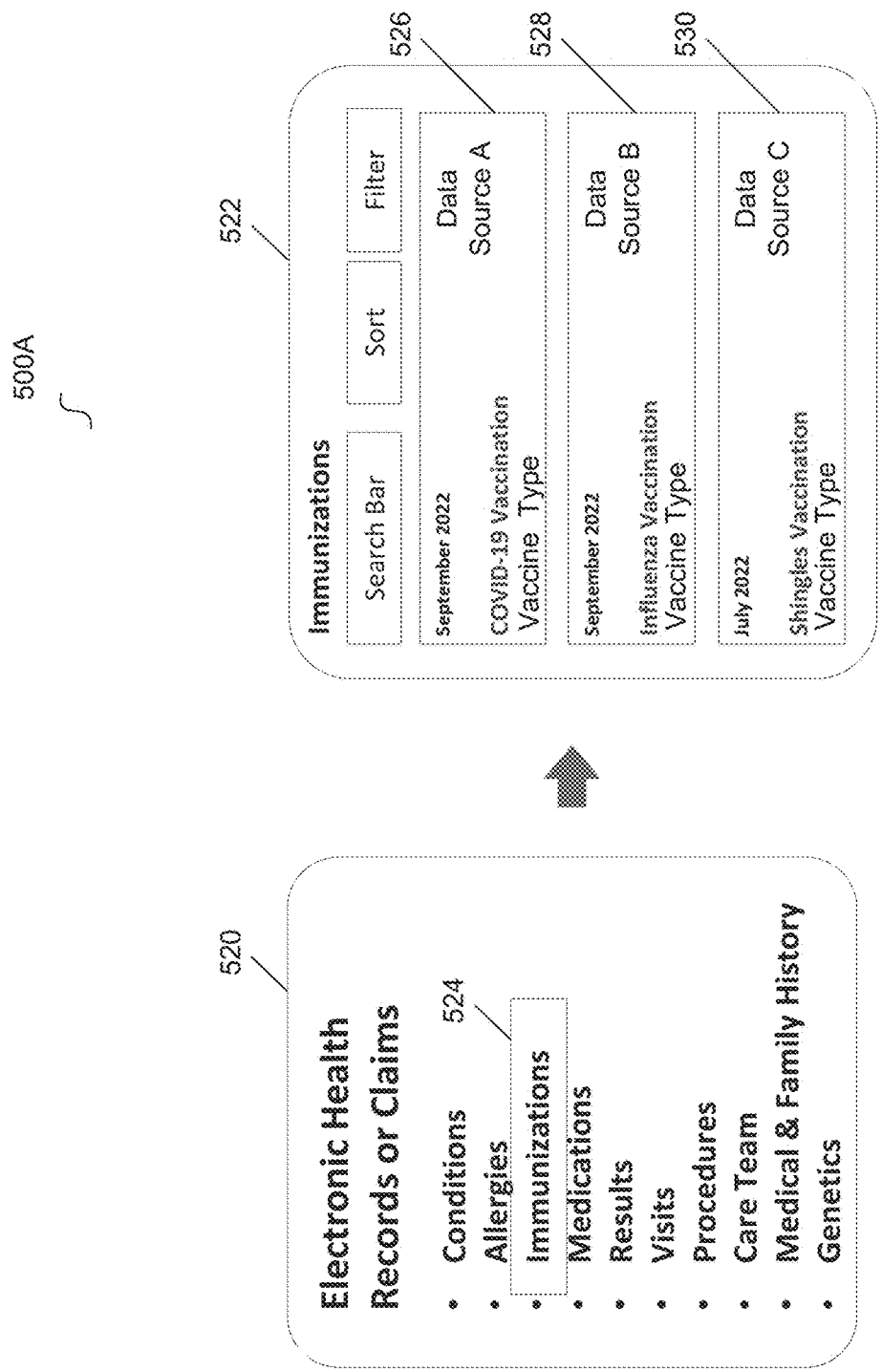
FIG. 5A illustrates user interfaces for sharing a segment of secure user information according to an example embodiment.
Figure 5B:
FIG. 5B illustrates user interfaces for creating a new category of secure user information according to an example embodiment.

Wireless device 302 can comprise an information management application, such as an application that permits a user to manage the user's secure information. The information management application (e.g., native application, web application, etc.) executing at wireless device 302 can permit the user to configure NFC transmission(s) to organizational system 304 via NFC module 310. For example, the user can select scope definitions (e.g., document identifiers, segments or portions of secure user information, etc.) via the information management application. FIGS. 5A-5C further describe user selections via the information management application to configure NFC transmission(s). The scope definitions define what parts or portions of the user's secure information, such as segments of the user's electronic health records, that organizational system 304 is granted access to via NFC transmission(s) from wireless device 302.

Wireless device 302 and NFC module 310 can comprise NFC enabled hardware that permits information sharing via a secure NFC protocol. The user can configure the information management application to share data with NFC module 310 when it is detected that wireless device 302 is proximate to NFC module 310. For example, the sharing data transmitted via the information management application can comprise: an indicator for the user, scope definitions (e.g., documents identifiers, segments or portions of secure user information identifiers, etc.), or any other suitable data. FIG. 4A further describes NFC transmission(s) between wireless device 302 and NFC module 310.

Organizational system 304 can then submit a request to secure information manager 306 to access the user's secure information stored at secure user information 308. In some implementations, data module 312 can generate an access request using the data shared by the information management application executing at wireless device 302. For example, data module 312 can associate the user identifier with documents the user has previously completed that are stored at secure user information 308, and retrieve and/or request access to these documents. In another example, data module 312 can identify documents via document identifier(s) comprised in the scope definitions received from wireless device 302, and retrieve/request access to these identified documents from secure information manager 306. In another example, the scope definitions received from wireless device 302 can define segments of a user's secure information (e.g., electronic health records segments and dimension values), and data module 312 can retrieve/request access to these segments of the user's secure information from secure information manager 306.

In some implementations, the sharing data received from wireless device 302 can be encoded or encrypted. For example, data module 312 can decrypt and/or decode the sharing data (e.g., user identifier(s), scope definition(s), etc.) to generate the data request for secure information manager 306. In another example, data module 312 can transmit the encrypted and/or encoded sharing data to secure information manager 306, and secure information manager 306 can decrypt and/or decode the sharing data in order to grant organizational system 304 access to the scope of secure user information defined in the sharing data. For example, secure information manager 306 can interact with credential service 314 to decrypt and/or decode the sharing data using any suitable credential (e.g., encryption key, etc.).

In some implementations, decrypting and/or decoding the sharing data by secure information manager 306 can authenticate that the sharing data was originally encrypted and/or encoded by the information management application executing at wireless device 302. For example, wireless device 302 and credential service 314 may store paired keys (e.g., public-private keys, asymmetric keys, etc.) such that that decryption of the sharing data by secure information manager 306 via the corresponding key (e.g., key of the paired keys) from credential service 314 can authenticate the sharing data originated at wireless device 302. In another example, the information management application at wireless device 302 can digitally sign the sharing data using a stored credential, and secure information manager 306 can authenticate the digital signature.

In some implementations, once secure information manager 306 receives the user identifier and/or scope definitions from the sharing data, secure information manager 306 can permit organizational system 304 access to the user's secure information in accordance with the user identified by the user identifier and the scope definition(s). In another example, once secure information manager 306 decrypts/decodes the user identifier and/or scope definitions from the sharing data, secure information manager 306 can permit organizational system 304 access to the user's secure information in accordance with the user identified by the user identifier and the scope definition(s).

FIG. 4A illustrates near-field communication between systems according to an example embodiment. Diagram 400A includes wireless device 302, organizational system 304, and NFC module 310 from FIG. 3, and sharing data 402. Once wireless device 302 detects that the NFC receiver component of NFC module 310 is within a threshold distance (e.g., inches or centimeters), the NFC transmission from wireless device 302 to NFC module 310/organizational system 304 can be triggered. The NFC transmission can communicate sharing data 402 from wireless device 302 to NFC module 310/organizational system 304.

Sharing data 402 can include a user identifier and scope definition(s). For example, the user identifier can be an identifier for the user's medical health records (e.g., master-patient index identifier, medical record number, insurance claim identifier, etc.) or any other suitable user identifier. Scope definition(s) can be document identifiers, electronic health records segments/dimension values, and other suitable scope definitions.

For example, the user's secure information may be a segmented health record, and the data points covered by the scope definition(s) can be any suitable segments of the segmented health record. For example, the user's secure information can be electronic health data segmented based on segments and segment dimension values. Example segments can include: originating physician and/or medical organization (e.g., entity identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), images (e.g., radiology scans, x-rays, ultrasound images, MRI images, and the like), date of information origination, electronic health record format, other Health Level Seven (HL7), Fast Healthcare Interoperability Resource (FHIR), and/or Substitute Medial Applications and Reusable Technologies (SMART) on FHIR data parameters, or any other suitable health data parameters. In some embodiments, segments can include structured and unstructured data.

Using the information management application executing at wireless device 302, the user can define what portions of the user's electronic health data to share via NFC transmission(s) by providing parameter values (e.g., segment dimension values) that define the scope. In some implementations, the information management application can encode the segments and/or segment dimension values provided by the user when determining/generating the scope definition(s) of the sharing data. For example, the information management application can encode the scope definition(s) into an encoded sequence of characters that map to portions of a user's secure information. For example, the user can define which portions of the user's secure information to share via interactions with wireless device 302 and the launched application, and the launched application can generate encoded scope definition(s), which represent an encoded version of the user defined portions. In some implementations, a predefined mapping can map the portions of the user's secure information to the encoded scope sequence.

For example, via interactions with the application executing at the user's wireless device, the user can specify the following segment dimension values: originating physician and/or medical organization-ALL; types-medications, tests and results, medical history, family history, biometrics, vaccine information, and allergies; relevant health practices-cardiology, primary care physician, and neurology; date of information origination-ALL; and electronic health record format-ALL. Other example segment dimension values for date of information include past two years, past year, since the age of 18, custom time range (e.g., Jan. 1-31, 2023), etc. The user's electronic health data that matches the segment dimension values specified by the user can be scoped for sharing via NFC transmission(s) and sharing data 402.

A predefined mapping can map the user's health data segments to the encoded scope sequence. In an example, a formatting for the sequence can define which sequence of characters map to a segment dimension and which sequence of characters map to values for that segment dimension. A sample encoded scope sequence comprises [A:XYX, C:1C3B, X:1456, etc.]. In an example predefined mapping, the initial symbols of the encoded scope sequence can map to one of the electronic health data segments (e.g., originating or attributed physician and/or medical organization, type of information, relevant health practice, date of information origination, electronic health record format, etc.). In this example, predefined mapping, the symbols after the ':' value can map to segment dimension values.

In an example where the letter 'A' maps to date of information origination in the predefined mapping, the symbols 'XYX' can map to the segment dimension value 'Information from the last 5 years'. Other symbols can map to other date of information origination segment dimension values, such as 'ALL', 'since the age of 18', or custom date ranges. In an example where the letter 'C' maps to types of information in the predefined mapping, the symbols '1C3B'' can map to a subset of information types (e.g., medications, tests and results, medical history, family history, biometrics, vaccine information, and allergies). Other symbols can map to other subsets of types of information.

In an example where the letter 'X' maps to relevant health practices in the predefined mapping, the symbols '1456' can map to a subset of health practices (e.g., cardiology, primary care, neurology, and oncology). Other symbols can map to other subsets of health practices. In this example, encoded scope sequence can define segments of a user's electronic health data and segment dimension values for those segments. When wireless device 302 transmits sharing data 302 via NFC and NFC module 310, organizational system 304 can receive the sharing data and use the received data to request access to the user's secure information. For example, organizational system 304 can submit a data access request (e.g., to secure information manager 306 of FIG. 3) that comprises the encoded scope definition(s) or the decoded scope definitions (e.g., after data module 312 FIG. 3 decodes the encoded scope sequence). In some implementations, secure information manager 306 can similarly decode the scope definitions, such as when organizational system 304 submits the encoded scope definitions in an access request. Because the user defines the scope definitions via the information management application at wireless device 302, the access permitted to organizational system 304 is controlled by the user's selections.

FIG. 4B illustrates a simplified data model according to an example embodiment. Diagram 400B includes data tables 410, 412, and 414. Data table 410 represents data for organizational systems (e.g., healthcare providers). Data table 412 represents users' data (e.g., patients' data). Data table 412 represents access permissions between the organizational systems and the users. In some implementations, data tables 410, 412, and 414 can be managed by secure information manager 306 of FIG. 3, data source 106 of FIG. 1, or any other suitable system component.

In some implementations, data table 410 comprises a checksum data filed, such as a hash of one or more other data fields in a given row of the data table. Data table 412 can also comprise a checksum data filed, such as a hash of one or more other data fields in a given row of the data table. In some implementations, the NFC transmission between wireless device 302 and the organizational system 304 can include the user's checksum data field value (e.g., the value of the checksum data field in the row the corresponds to the user).

A data access request from organizational system 304 can include this user checksum data field as well as an indicator that represents the organizational system (e.g., the checksum value from the row the corresponds to the organizational system in data table 412). When these two checksums identify a given user and a given organization (e.g., healthcare provider), an entry can be crated in data table 414 that links the two so that the organizational system is granted access to the user's secure information (e.g., patient's electronic health records). In some implementations, the access is limited to user defined scope restrictions, such as scope definition(s) defined via user interactions with an information management application executing at wireless device 302.

FIG. 5A illustrates user interfaces for sharing a segment of secure user information according to an example embodiment. Diagram 500A includes interfaces 520 and 522, segment 524, and immunizations 526, 528, and 530. Diagram 500A represents a user workflow for selecting a portion of an electronic health record for sharing with an organizational system via NFC transmission(s). Interface 520 can display categories or segments of secure user information, and the user can select one of the displayed categories, such as segment 524. In response to the selection, interface 522 can display electronic health record information under the segment/category. For example, segment 524 can correspond to immunizations, and interface 522 can display immunization elements 526, 528, and 530, which can each list details about specific ones of the user's past immunizations. The user can select individual immunization to share via NFC transmission(s). For example, the user selections can be encoded as scope definition(s), and the scope definitions can be included in sharing data that is transmitted via NFC transmission(s) that support secure user information sharing. In some implementations, the immunization data itself can be transmitted over NFC transmission(s), for example if the data file meets size restrictions for practical NFC transmission.

A user workflow can also define a new category or segment used for managing the user's electronic health record. FIG. 5B illustrates user interfaces for creating a new category of secure user information according to an example embodiment. Diagram 500B includes interfaces 540 and 542, segments 544, button 546, name input 548, and button 550.

Interface 540 can display categories or segments of secure user information, and the user can select two or more of the displayed categories/segments, such as segments 544. Once selected, the user can progress from interface 540 to interface 542 via button 546. Interface 542 can, in response to the selection, create a logical combination of the two segments/categories of the user's electronic health record, the user can provide a name for the logical combination via name input 548, and complete the logical combination via button 550.

The logical combination can be used to manage and/or selectively share the user's secure information. For example, the user can select the logical combination to efficiently share the two combined segments/categories via NFC transmission(s). For example, the user selections can be encoded as scope definition(s), and the scope definitions can be included in sharing data that is transmitted via NFC transmission(s) that support secure user information sharing.

Figure 6A:
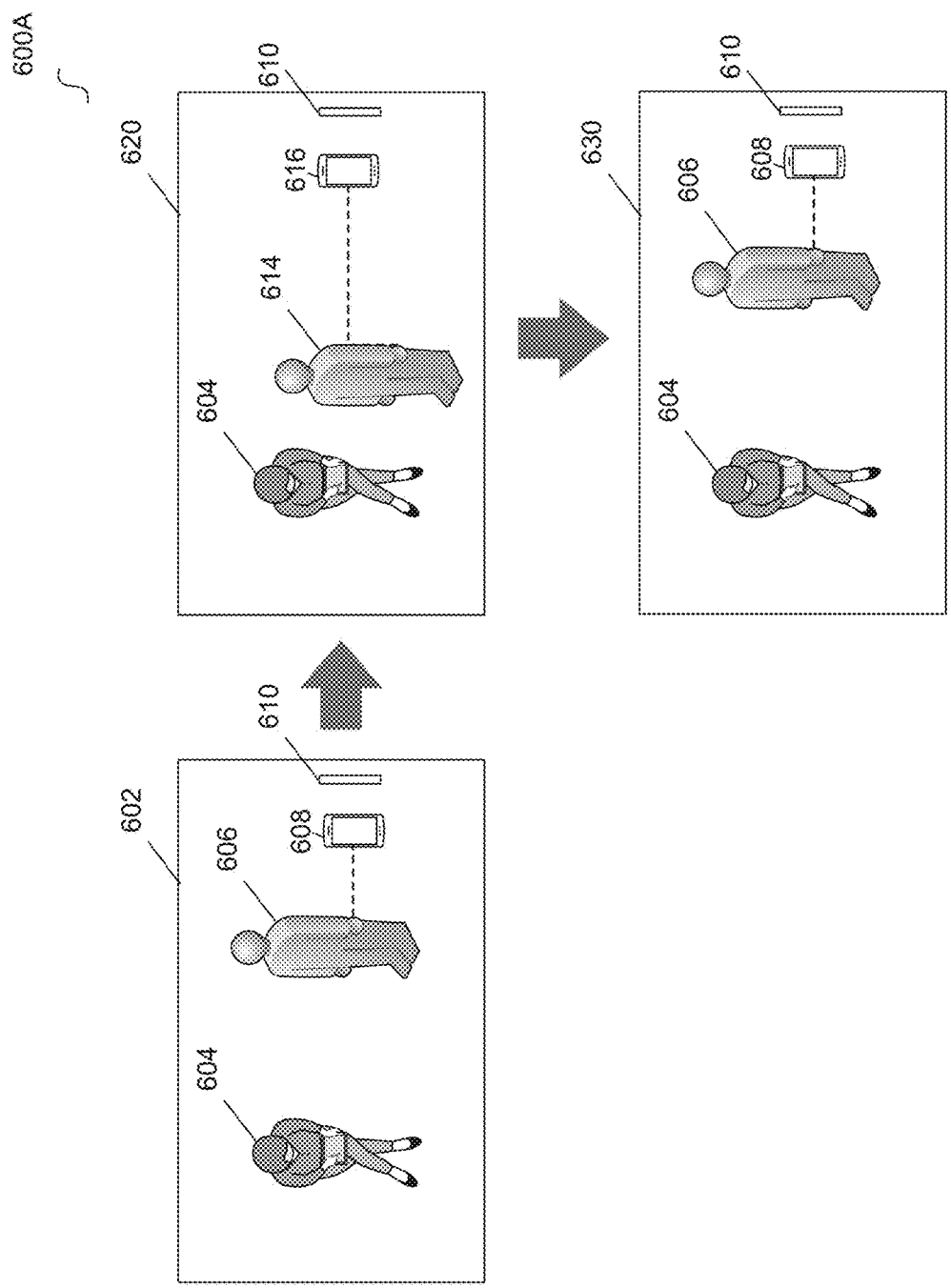
FIG. 6A illustrates a conceptual diagram of a workflow that leverages near-field communication to support workflow analytics according to an example embodiment.

FIG. 6A illustrates a conceptual diagram of a workflow that leverages near-field communication to support workflow analytics according to an example embodiment. Diagram 600A includes workflow stages 602, 620, and 630, patient 604, clinicians 606 and 614, wireless devices 608 and 616, and NFC reader 610.

Workflow states 602, 620, and 630 can represent three stages of a medical appointment, in sequence. For example, patient 604 may be examined by clinician 606 (e.g., a nurse) and a series of initial functions can be performed at workflow stage 602. Next, at workflow stage 620, patient 604 may be examined by clinician 614 (e.g., a doctor), and a series of functions can be performed at workflow stage 620. Finally, at workflow stage 630, patient 604 may be examined by clinician 606 again (or workflow stage 630 may involve another clinician) and a series of concluding functions can be performed at workflow stage 630. These workflow stages represent a simplified example, and actual medical appointments may involve several more stages.

In some implementations, at each stage in the workflow clinicians 606 and 614 can scan wireless devices 608 and 616, respectively, to NFC reader 610 such that the progress of the appointment can be logged and analyzed. For example, the scanning (e.g., NFC transmissions) can trigger logging of the stage of the workflow, timestamp, portions of appointment information (e.g., whether a checklist was complete or incomplete), and the like. This logged information can then be analyzed to generate additional insights into healthcare quality, clinician productivity, and/or personnel training decisions.

Figure 6B:
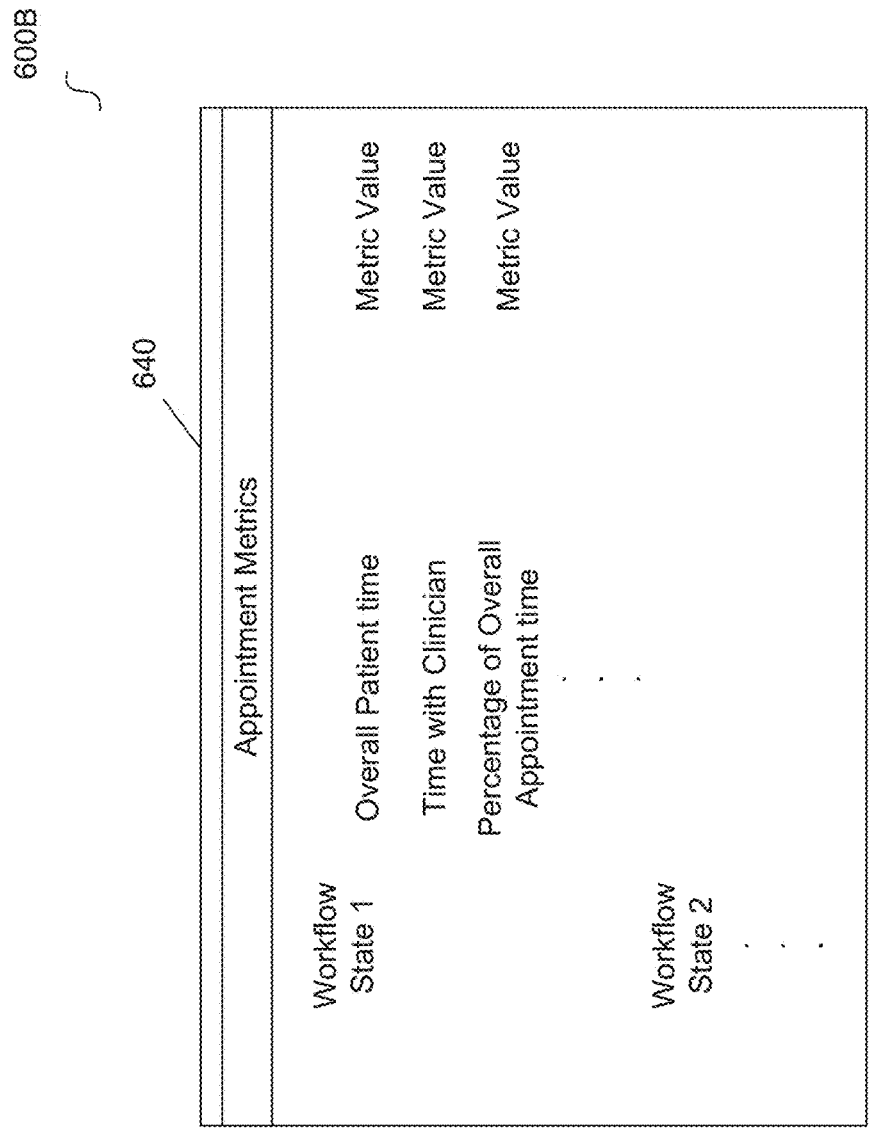
FIG. 6B illustrates a conceptual diagram of a workflow analytics dashboard according to an example embodiment.

FIG. 6B illustrates a conceptual diagram of a workflow analytics dashboard according to an example embodiment. Diagram 600B is a user interface that illustrates dashboard 640. Dashboard 640 can be displayed via an application (e.g., native application, web application, etc.), such as a browser. For example, the generated information related to workflow states 602, 620, and 630 from FIG. 6A can be analyzed to generate appointment metrics. Example metrics include: duration of time a patient is at each workflow state, transition time between workflow states, wait time from check-in to first workflow state, time each task takes at each workflow state, ratio of appointment duration time to each workflow state, overall appointment time (e.g., time from check-in to check-out), time between any two workflow states, or any other suitable metrics. Such appointment metrics can be calculated using data per appointment, per patient, over a number of appointments and/or patients, per clinician, over a number of clinicians, per clinic or over a number of clinics, any combination thereof, or over any other suitable grouping or scenario.

In some implementations, appointment metrics can also be calculated with respect to the patients' check-in procedure, such as NFC check-in (e.g., using the patient's wireless device) versus conventional check-in (e.g., manual check-in). Example metrics include: number of NFC patient check-ins versus conventional check-ins, number of completed documents accomplished via NFC check-in, time metrics for NFC check-in versus conventional check-in, and the like.

Figure 7:
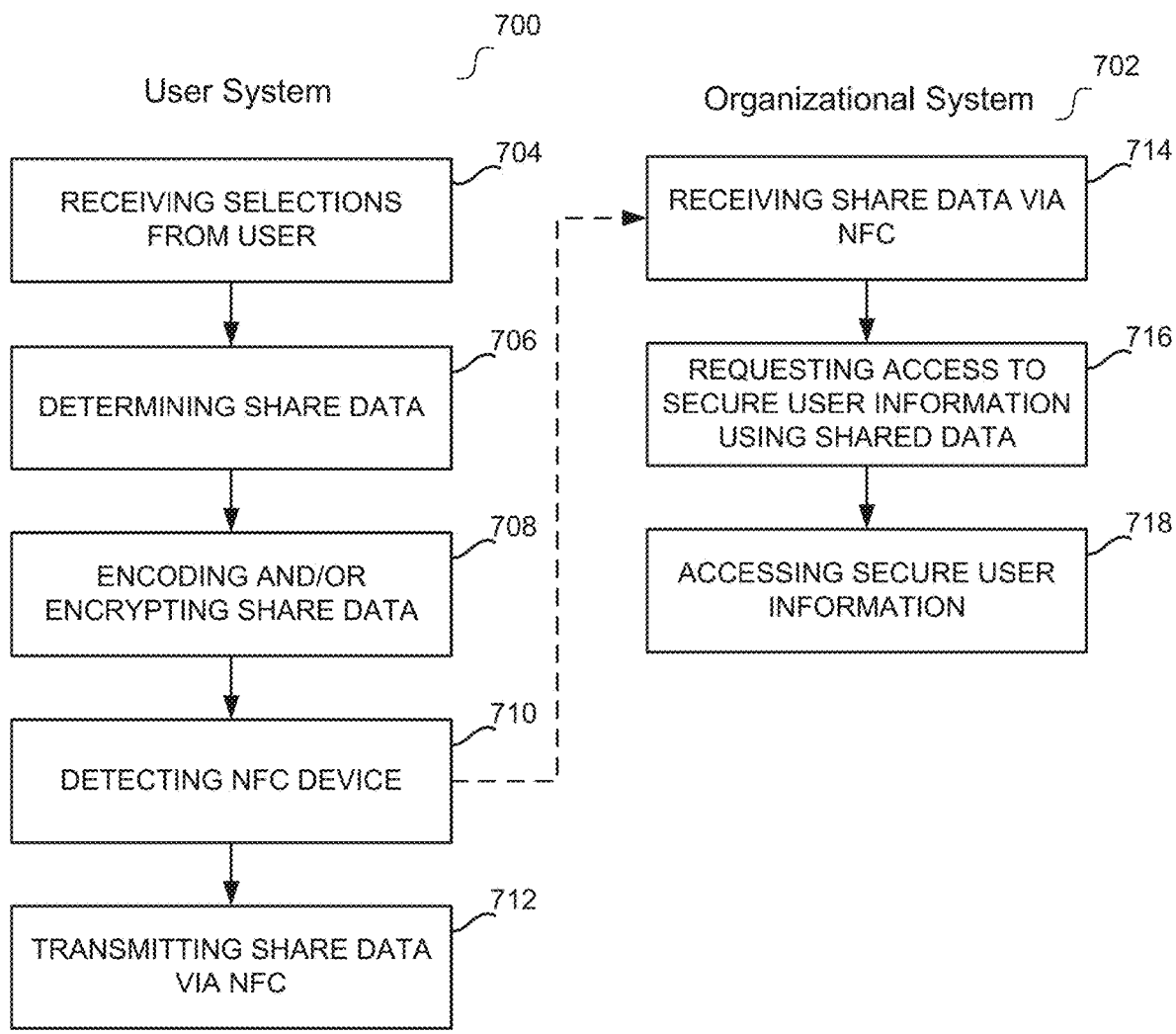
FIG. 7 illustrates a flow diagram for permitting secure information exchange using lightweight data and near-field communication according to an example embodiment.

FIG. 7 illustrates a flow diagram for permitting secure information exchange using lightweight data and near-field communication according to an example embodiment. In one embodiment, the functionality of FIG. 7 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Process 700 can be performed by a user's wireless device, such as smartphone, tablet, or other suitable wireless device. Process 702 can be performed by an organizational computing system (e.g., cloud computing system, on-premises computing system, a combination, or any other suitable computing system) that accesses secure user information.

At block 704, process 700 can receive selections from a user. For example, selection input can be received at the wireless device via an interface (e.g., interface of an information management application at the wireless device), and the selection input can define one or more scope definitions with respect to the user's secure information. In some implementations, the selection input comprises segment identifiers that define segments of the user's secure information and/or segment dimension values. In some implementations, the selection input comprises document identifiers.

At block 706, process 700 can determine sharing data. For example, sharing data that comprises a user indicator and one or more scope indicators can be generated and/or retrieved from storage. The user indicator can identify the user of the wireless device. The scope indicator(s) can represent the scope definitions received via the user selections.

At block 708, process 700 can encrypt and/or encode the sharing data. For example, the wireless device can comprise one or more credential(s) for encrypting the sharing data. In another example, the sharing data can be digitally signed using the credential(s).

In some implementations, the user selections comprise segment identifiers and/or segment dimension values that are translated into encoded representations using a predefined mapping. For example, the predefined mapping can translate segment identifiers and/or segment dimension values into symbols representative of the segment identifiers and/or segment dimension values. In some implementations, the encoded representation comprises a set of symbols that encode the segment identifiers and/or segment dimension values, and a data size of the set of symbols is less than a data size of the segment identifiers and/or segment dimension values. For example, the encoding of the segment identifiers and/or segment dimension values reduces the NFC transmission payload size. In some implementations, the user selections comprise document identifiers that are encrypted and/or encoded.

At block 710, process 700 can detect a proximate NFC device. For example, the wireless device comprises NFC enabled hardware that can detect proximate NFC enabled hardware within a threshold distance (e.g., inches, centimeters, etc.).

At block 712, process 700 can transmit sharing data via NFC. For example, the determined sharing data can be securely transmitted from the wireless device to an NFC receiver that is part of the organizational computing system. At block 714, process 702 can receive the sharing data via NFC. For example, the NFC receiver that is part of the organizational computing system can receive the sharing data via NFC transmission(s) from the wireless device.

At block 716, process 702 can request access to secure user information using the sharing data. For example, the organizational computing system can request, from a secure data source, access to the user's secure information using the user indicator and scope indicator(s) from the sharing data. At block 718, process 702 can access the secure user information. For example, the organizational computing system can be permitted, by the secure data source in response to the request, scope limited access to the user's secure information that corresponds to the one or more scope indicators.

In some implementations, the sharing data is encrypted by the wireless device, the request from the organizational computing system to the secure data source comprises the encrypted sharing data, and the secure data source decrypts the sharing data and permits the scope limited access to the user's secure information using the user indicator and one or more scope indicators decrypted from the encrypted sharing data. For example, the secure data source and wireless device may comprise paired keys such that decryption of the encrypted sharing data using the paired key at the secure data source authenticates the encryption device as the user's wireless device.

In some implementations, the selection input and sharing data comprise document identifiers, the request from the organizational computing system to the secure data source comprises the document identifiers, and the scope limited access to the user's secure information permits the organizational system access to secure user documents that correspond to the document identifiers. In some implementations, the document identifiers are encrypted or encoded, the request from the organizational computing system to the secure data source comprises the encrypted or encoded document identifiers, and the secure data source decrypts or decodes the document identifiers and permits the scope limited access to the user's secure information using the user indicator and decrypted or decoded document identifiers.

In some implementations, the selection input and sharing data comprise segment identifiers and/or segment dimension values that are translated into encoded representations using a predefined mapping, the request from the organizational computing system to the secure data source comprises the encoded representations of the segment identifiers and/or segment dimension values, and the scope limited access to the user's secure information permits the organizational system to access secure user information that corresponds to the user defined segment identifiers and/or segment dimension values. For example, the secure data source can decode the encoded representations of the segment identifiers and/or segment dimension values (e.g., using the predefined mapping) and permit the scope limited access using the user indicator and decoded segment identifiers and/or segment dimension values.

Embodiments permit secure information exchange using lightweight data and near-field communication (NFC). A user can transmit lightweight data, such as one or more indicators (e.g., user indicator, scope indicator(s), documents indicator(s), etc.), to a receiving computing system via the user's wireless device and an NFC protocol. Because NFC transmissions are performed by co-located devices, this lightweight data transmission can trigger and/or continue a sophisticated workflow. For example, the receiving computing system can be associated with a product or service provider, and the lightweight data transmission can progress a workflow related to a particular product and/or service.

In some implementations, the indicator(s) transmitted over the NFC transmission(s) can reference one or more of the user, electronic document(s), secure user information, portions of a workflow, other suitable electronic information related to the user, or any combination thereof. For example, the NFC transmission of the indicator(s) can represent a physical "check-in" at a service provider. The receiving system (e.g., computing system associated with the service provider) can retrieve stored information referenced by the transmitted indicator(s), such as electronic documents associated with the user (e.g., pre-filled questionnaires, personal information, etc.), secure user information (e.g., electronic health records), and the like. In another example, the NFC transmission can be a signal that references portions of a workflow, such as the stages of a health care appointment, device/system usage workflow, or the like. In this example, using the NFC transmissions and the context in which they occur (e.g., timestamps, etc.) the service provider can audit appointments (e.g., health care appointments), device usage, system usage, or other suitable workflows for compliance, safety, and/or production metrics.

In some implementations, the indicator(s) transmitted from the user's wireless device to the receiving system can be encoded and/or encrypted. For example, the wireless device may comprise credentials (e.g., public and/or private cryptographic keys, etc.), and the indicator(s) may be encrypted, digitally signed via a credential, etc. In another example, the indicator(s) can be encoded via a translation module (e.g., predefined mapping) that maps indicator(s) to encoded data (e.g., symbols, etc.). In some implementations, the encoding and/or encrypting may compress data such that the NFC payload size (e.g., indicator(s)) is compatible with NFC protocols and/or is practical to transmit via NFC.

Embodiments also permit scope limited access to a user's secure information using NFC information exchange(s). In some implementations, a user can register with a secure data source and control the scope with which the user's secure information (e.g., electronic health records) is shared. For example, the user can, via a wireless device or other suitable computing system, select scope definitions that control how the user's secure information is shared with an organization. The user can transmit, via NFC and the user's wireless device, sharing data to the organization's computing system. The organization's computing system can then submit a request to access the user's secure information using the information received from the user's wireless device to the secure data source. For example, information within the request can include aspects of the received sharing data, such as a user indicator, scope indicator(s) (e.g., indicator(s) representative of the user's selected scope definitions), and the like. In some implementations, the sharing data can comprise encrypted and/or encoded indicator(s).

Embodiments of the user's secure information can be electronic health data segmented based on segments and segment dimension values, and scope definitions that define the access restrictions to the user's secure information can correspond to limited portions of the user's electronic health data. For example, the segments can include: originating physician and/or medical organization (e.g., entity identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), images (e.g., radiology scans, x-rays, ultrasound images, MRI images, and the like), date of information origination, electronic health record format, other Health Level Seven (HL7), Fast Healthcare Interoperability Resource (FHIR), and/or Substitute Medial Applications and Reusable Technologies (SMART) on FHIR data parameters, or any other suitable health data parameters. In some embodiments, segments can include structured and unstructured data. The user can define what portions of the user's electronic health data to share via NFC transmission(s) by providing segment dimension values that define the scope.

The user can define the scope definition(s) for NFC transmission(s) (e.g., the scope definitions that define which portions/segments of a user's secure information to share) using an information management application executing at the user's wireless device. For example, the user can define a sharing scope that identifies data points of the user's secure information that can be shared with an organization via NFC transmission(s). In another example, the user can define scope definition(s) by selecting individual documents, groups of documents, or any other suitable portion of secure user information stored at a secure data source to share via NFC transmission(s).

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method for permitting scope limited access to a user's secure information using near-field communication (NFC), the method comprising:
    determining, at a wireless device, sharing data that comprises a user indicator and one or more scope indicators, wherein the user indicator identifies a user and the one or more scope indicators represent scope definitions with respect to the user's secure information;
    detecting an NFC device proximate to the wireless device; and
    transmitting, in response to the detecting, the determined sharing data to the NFC device using an NFC communication protocol, wherein,
        the NFC device is part of an organizational computing system,
        the organizational computing system requests, from a secure data source, access to the user's secure information using the user indicator and the one or more scope indicators from the sharing data; and
        the organizational computing system is permitted, by the secure data source in response to the request, scope limited access to the user's secure information that corresponds to the one or more scope indicators.

2. The method of claim 1, further comprising:
    receiving, at the wireless device, selection input via an interface that defines the one or more scope definitions with respect to the user's secure information.

3. The method of claim 2, further comprising:
    encrypting, prior to the transmitting, the sharing data, wherein the sharing data transmitted to the NFC device is the encrypted sharing data.

4. The method of claim 3, wherein,
    the request from the organizational computing system to the secure data source comprises the encrypted sharing data; and
    the secure data source decrypts the sharing data and permits the scope limited access to the user's secure information using the user indicator and the one or more scope indicators decrypted from the encrypted sharing data.

5. The method of claim 2, wherein,
    the selection input comprises segment identifiers that define segments of the user's secure information and/or segment dimension values, and
    the one or more scope indicators comprise encoded representations of the segment identifiers and/or segment dimension values.

6. The method of claim 5, further comprising:
    translating the segment identifiers and/or segment dimension values into the encoded representations using a predefined mapping.

7. The method of claim 6, wherein the predefined mapping translates segment identifiers and/or segment dimension values into symbols representative of the segment identifiers and/or segment dimension values.

8. The method of claim 6, wherein,
    the encoded representation comprises a set of symbols that encode the segment identifiers and/or segment dimension values, and
    a data size of the set of symbols is less than a data size of the segment identifiers and/or segment dimension values.

9. The method of claim 2, wherein,
the selection input comprises document identifiers,
the request from the organizational computing system to the secure data source comprises the document identifiers, and
the scope limited access to the user's secure information permits the organizational system to access secure user documents that correspond to the document identifiers.

10. The method of claim 9, wherein,
the document identifiers are encrypted or encoded,
the request from the organizational computing system to the secure data source comprises the encrypted or encoded document identifiers, and
the secure data source decrypts or decodes the document identifiers and permits the scope limited access to the user's secure information using the user indicator and decrypted or decoded document identifiers.

11. A non-transitory computer readable medium having instructions stored thereon that, when executed by a processor, cause the processor to permit scope limited access to a user's secure information using near-field communication (NFC), wherein, when executed, the instructions cause the processor to:
determine, at a wireless device, sharing data that comprises a user indicator and one or more scope indicators, wherein the user indicator identifies a user and the one or more scope indicators represent scope definitions with respect to the user's secure information;
detect an NFC device proximate to the wireless device; and
transmit, in response to the detecting, the determined sharing data to the NFC device using an NFC communication protocol, wherein,
the NFC device is part of an organizational computing system,
the organizational computing system requests, from a secure data source, access to the user's secure information using the user indicator and the one or more scope indicators from the sharing data; and
the organizational computing system is permitted, by the secure data source in response to the request, scope limited access to the user's secure information that corresponds to the one or more scope indicators.

12. The non-transitory computer readable medium of claim 11, wherein the instructions cause the processor to:
receive, at the wireless device, selection input via an interface that defines the one or more scope definitions with respect to the user's secure information.

13. The non-transitory computer readable medium of claim 12, wherein instructions cause the processor to:
encrypt, prior to the transmitting, the sharing data, wherein the sharing data transmitted to the NFC device is the encrypted sharing data.

14. The non-transitory computer readable medium of claim 13, wherein,
the request from the organizational computing system to the secure data source comprises the encrypted sharing data; and
the secure data source decrypts the sharing data and permits the scope limited access to the user's secure information using the user indicator and the one or more scope indicators decrypted from the encrypted sharing data.

15. The non-transitory computer readable medium of claim 12, wherein,
the selection input comprises segment identifiers that define segments of the user's secure information and/or segment dimension values, and
the one or more scope indicators comprise encoded representations of the segment identifiers and/or segment dimension values.

16. The non-transitory computer readable medium of claim 15, wherein the instructions cause the processor to:
translate the segment identifiers and/or segment dimension values into the encoded representations using a predefined mapping.

17. The non-transitory computer readable medium of claim 16, wherein the predefined mapping translates segment identifiers and/or segment dimension values into symbols representative of the segment identifiers and/or segment dimension values.

18. The non-transitory computer readable medium of claim 16, wherein,
the encoded representation comprises a set of symbols that encode the segment identifiers and/or segment dimension values, and
a data size of the set of symbols is less than a data size of the segment identifiers and/or segment dimension values.

19. The non-transitory computer readable medium of claim 12, wherein,
the selection input comprises document identifiers,
the request from the organizational computing system to the secure data source comprises the document identifiers, and
the scope limited access to the user's secure information permits the organizational system to access secure user documents that correspond to the document identifiers.

20. A system for permitting scope limited access to a user's secure information using near-field communication (NFC), the system comprising:
a processor; and
a memory storing instructions for execution by the processor, the instructions configuring the processor to:
determine, at a wireless device, sharing data that comprises a user indicator and one or more scope indicators, wherein the user indicator identifies a user and the one or more scope indicators represent scope definitions with respect to the user's secure information;
detect an NFC device proximate to the wireless device; and
transmit in response to the detecting, the determined sharing data to the NFC device using an NFC communication protocol, wherein,
the NFC device is part of an organizational computing system,
the organizational computing system requests, from a secure data source, access to the user's secure information using the user indicator and the one or more scope indicators from the sharing data; and
the organizational computing system is permitted, by the secure data source in response to the request, scope limited access to the user's secure information that corresponds to the one or more scope indicators.

* * * * *